United States Patent [19]

Peiffer et al.

[11] Patent Number: 4,911,874
[45] Date of Patent: Mar. 27, 1990

[54] PROCESS AND APPARATUS FOR COOLING A MOLTEN FILM EXTRUDED FROM A SLOT DIE INTO A COOLING SYSTEM

[75] Inventors: Herbert Peiffer, Mainz; Guenther Crass, Taunusstein-Wehen; Wolfgang Dietz, Saarbrucken, all of Fed. Rep. of Germany

[73] Assignee: Hoechst Aktiengesellschaft, Frankfurt/Main, Fed. Rep. of Germany

[21] Appl. No.: 311,387

[22] Filed: Feb. 15, 1989

Related U.S. Application Data

[63] Continuation of Ser. No. 87,828, Aug. 21, 1987, abandoned.

[30] Foreign Application Priority Data

Aug. 27, 1986 [DE] Fed. Rep. of Germany ....... 3629105
Oct. 27, 1986 [DE] Fed. Rep. of Germany ....... 3635302

[51] Int. Cl.$^4$ ............... B29C 41/26; B29C 41/46; B29C 47/88
[52] U.S. Cl. ............ 264/178 R; 264/211.13; 264/216; 264/237; 425/71; 425/224; 425/325; 425/377; 425/378.1
[58] Field of Search ............ 264/178 R, 210.1, 210.7, 264/211.13, 216, 235.8, 237, 288.8, 289.6, 348; 425/66, 71, 224, 325, 377, 378.1, 446

[56] References Cited

U.S. PATENT DOCUMENTS 2,344,603 3/1944 Czapek ..................... 425/224 X
3,277,519 10/1966 Jones ......................... 425/71
3,324,218 6/1967 Gebler et al. ............... 264/210.7 X

FOREIGN PATENT DOCUMENTS 26911 4/1981 European Pat. Off. .
115917 8/1984 European Pat. Off. .
164912 12/1985 European Pat. Off. .
43-17820 7/1968 Japan ......................... 264/210.1
51-567 1/1976 Japan ......................... 264/216
54-42024 12/1979 Japan ......................... 425/66
57-98322 6/1982 Japan ......................... 264/178 R
59-59420 4/1984 Japan ......................... 264/237

Primary Examiner—Jeffery Thurlow
Assistant Examiner—Leo B. Tentoni
Attorney, Agent, or Firm—Foley & Lardner, Schwartz, Jeffery, Schwaab, Mack, Blumenthal & Evans

[57] ABSTRACT

A molten film extruded from a slot die onto a take-off drum in a cooling system is first cooled on the circumferential surface of the take-off drum and by the ambient air, is subsequently passed into the water bath of a water trough in which the take-off drum is immersed, and finally is transferred from the water bath of the water trough into a post-cooling water bath, in which the film solidifies to an intermediate film having a desired final temperature of approximately 40° C. When the film leaves the take-off drum, the partially solidified molten film has a mean temperature $T_u$ of between 100° C. and 120° C. For optimization of the dwell time of the molten film in the cooling system and in the post-cooling water bath, the drum diameter D of the take-off drum and the length L of the post-cooling water bath are determined by a specific relationship.

12 Claims, 4 Drawing Sheets

PROCESS AND APPARATUS FOR COOLING A MOLTEN FILM EXTRUDED FROM A SLOT DIE INTO A COOLING SYSTEM

This application is a continuation of application Ser. No. 087,828, filed Aug. 21, 1987, now abandoned.

BACKGROUND OF THE INVENTION

The invention relates to a process for cooling a molten film which is extruded from a slot die into a cooling system and stretched between the slot die and the cooling system, and also to an apparatus for implementation of the process.

The production of biaxially stretched flat films usually includes the following process steps: extrusion, molten film formation, molten film cooling to give the intermediate film, biaxial stretching with fixing and rolling-up of the film.

For instance, German Offenlegungsschrift No. 31 24 290 describes the production of a biaxially oriented polypropylene film which is extruded when molten and in web form, and which is subsequently cooled and solidified. The formed polypropylene film is preheated and oriented in the longitudinal direction and subsequently in the transverse direction. The longitudinal orientation takes place in this case in an at least a two stage process.

European Patent Application No. 0 026 911 discloses a process for the production of a biaxially stretched polypropylene film in which a longitudinal/transverse/longitudinal flat stretching process is carried out, to produce a longitudinally/transversely stretched polypropylene film with a double refraction value of between 0.010 and 0.030. This film is then restretched further in the longitudinal direction by 1.8 to 3.0 times its original length, the degree of necking being kept below 20%.

European Patent Application No. 0 115 917 describes a process for the production of a polypropylene film which is longitudinally stretched after extrusion from a die in the longitudinal direction by a ratio of 4 to 9 relative to its original length and the surfaces of the intermediate film are subsequently heated in order to bring the molecular chains in the surface layers into a nonoriented state. Thereafter, the film is restretched at a ratio of 1.2 to 3.

The process described in German Patent No. 15 04 454 for the production of shrinkable films from polypropylene provides for the extruded film to be stretched in the longitudinal direction to 5 to 7 times the original length and in the transverse direction to 8 to 13 times the original width, the second stretching taking place at a higher temperature than the first stretching. In heating the film to the longitudinal stretching temperature, the film is preheated to a temperature of between 125° and 140° C., then further heated to a temperature of between 140° and 150° C. while being simultaneously longitudinally stretched. Directly after the longitudinal stretching, the film is cooled, then heated to a temperature of between 150° and 165° C. and transversely stretched at a temperature of 150° to 160° C.

In the process step of molten film cooling to give the intermediate film, drum cooling is, at present, used virtually exclusively. In this technique, the molten film issues from a slot die and passes onto the surface of a cooled rotating drum. The following are typical data for the molten film and the take-off drum:

Width of the molten film: 0.5–2.0 m
Thickness of the molten film: 0.3–3.5 mm
Temperature of the molten film: 250°–300° C.
Drum diameter: 0.5–2.0 m
Circumferential speed of the drum: 20–60 m/min.

To achieve a good thickness profile and to avoid swelling of the extrudate, which entails the risk of surface defects, the molten film is stretched between the die and the drum. Typical stretching ratios are approximately 1.2 to 4.0 with polypropylene and approximately 4 to 25 with polyethylene terephthalate, the larger stretching figures relating to thinner molten film thicknesses. Where the molten film is fed onto the drum, it must be ensured that the reduction in width or the degree of necking caused by the elongation is kept small and that as little air as possible is drawn in between the molten film and the drum surface. A small degree of necking and a small amount of air intake can only be achieved by small distance between the die and the point of contact of the molten film, together with a suitable feeding method. Examples of suitable feeding methods are the air knife method, the suction box method and feeding with the aid of electrodes by the so-called pinning method.

The drum must fulfill two main requirements; namely, that it cool the molten film as effectively and evenly as possible and that it produce a satisfactory film surface.

To achieve an effective, i.e., rapid, cooling of the molten film, the heat transfer from the molten film to the drum must be as great as possible. This is achieved, for example, by cooling coils which are attached spirally to the inner surface of the shell of the take-off drum and through which cooled water flows. Another possibility is for the inner shell surface of the take-off drum to be sprayed with water over the entire circumference or part of the circumference (See, for example, European Patent Application No. 0 164 912).

The water/inner drum shell heat transfer is very intensive, with heat transfer coefficients (HTC) of up to $\alpha_{WS} \approx 3500$ W/m$^2$K being attainable here. Owing to the thermal resistance of the metal shell and the intermediate layer of drum surface/film, the heat exchange between cooling medium and film is reduced, so that in practice values for the transient coefficient $K_{WF}$ (cooling medium to film) in the range from 500 to 1500 W/m$^2$K are attained. In the production of polypropylene films, it has been found that the shorter the cooling time and the lower the film temperature reached during cooling, the better the optical properties of the film, such as gloss or dullness. The temperature of the intermediate film will be markedly less than 95° C. during this cooling.

The cooling time, which lasts until a desired temperature of the intermediate film is reached after the cooling operation, depends on the material, on the heat transfer coefficients of the film and on the thickness of the molten film. With known material, and a predetermined configuration of the take-off drum and thickness of the molten film, the variation in temperature in the film over time is fixed and is virtually non-susceptible to further influence.

The final temperature in the intermediate film, which hereafter always refers to the temperature of the film after leaving the cooling system, is thus solely a function of the dwell time of the molten film on the take-off drum.

With a given circumferential speed $v_A$ of the take-off drum, the dwell time $t_\omega$ of the film on the take-off drum is associated with the diameter D via the following equation: $t_\omega = \pi \alpha D / 360 \times v_A$. The angle $\alpha$ specifies here the angle of inclusion of the film on the drum.

According to this equation, for a constant circumferential speed $v_A$, a large dwell time can be achieved by a large diameter of the take-off drum. The solution which suggests itself is that of enlarging the drum diameter; however, it should be borne in mind that an increase in diameter is accompanied by disadvantages, such as, for example, inferior control over the process in terms of the concentricity characteristics of the take-off drum, temperature uniformity, rotary oscillation behavior, reduced space for the suction box feeding, greater traveling distance of the molten film in the case of air knife feeding and, above all, the risk of the molten film prematurely coming off the drum surface. This greatly reduces the heat transfer for the remaining cooling zone. Owing to this effect, the drum diameter must be increased beyond the design value, which can constitute a diameter increase of up to 50% in the case of large drums ($D \geq 1.5$ m).

SUMMARY OF THE INVENTION

It is therefore an object of the invention to provide a process for the cooling of a molten film in which the film is cooled as quickly as possible to as low a temperature as possible, without the molten film prematurely coming off of a metal surface within the cooling system.

It is also an object of the invention to provide an apparatus for the cooling of a molten film in which the film is cooled as quickly as possible to as low a temperature as possible, without the molten film prematurely coming off of a metal surface within the cooling system.

In accomplishing the foregoing objects, there has been provided according to one aspect of the present invention a process for cooling a molten film which is extruded from a slot die, comprising the steps of providing a cooling drum disposed in a first water bath; providing a second water bath; contacting one surface of the molten film to the circumferential surface of the cooling drum so that heat transfer occurs between the one surface of the molten film and the cooling drum and between the other surface of the molten film and the air; rotating the cooling drum to move the molten film through the first water bath, whereby the molten film is cooled and partially solidified such that it will not prematurely separate from the cooling drum and is removable from the cooling drum without elongation; removing the partially solidified molten film from the cooling drum; and moving the partially solidified molten film through the second water bath to bring the molten film to a desired final temperature.

In accordance with another aspect of the invention, there is provided an apparatus for cooling a molten film which i stretched immediately after being extruded from a slot die comprising a first water bath; a cooling drum having a circumferential surface for receiving the stretched molten film on its circumferential surface directly after the film is stretched, the cooling drum being disposed in the first water bath for rotation about its longitudinal axis; means for rotating the cooling drum around its longitudinal axis, whereby the cooling drum moves the received molten film through the first water bath so that the molten film is cooled and partially solidified to the extent that it will not prematurely separate from the cooling drum and can be removed without elongation; means for removing the partially solidified molten film from the circumferential surface of the cooling drum; a second water bath; and means for moving the partially solidified molten film through the second water bath, whereby the molten film is cooled to a desired final temperature.

Further objects, features and advantages of the present invention will become apparent from the detailed description of preferred embodiments that follows, when considered together with the attached figures of drawing.

BRIEF DESCRIPTION OF THE DRAWINGS

The invention will be explained in more detail below with reference to the drawings, in which.

DETAILED DESCRIPTION OF THE PREFERRED EMBODIMENTS

According to the invention, the molten film in the cooling system is first cooled by heat transfer from one molten film surface to a metal surface, and from the other molten film surface to air, then the film is further cooled in a water bath of the cooling system before it comes off of the metal surface, and, finally, it is brought to the desired final temperature in a second post-cooling water bath.

In a preferred aspect of the process, the molten film which has been partially solidified on the metal surface is passed through water during the transition from the water bath into the second, postcooling water bath. In this way, the molten film, up to the time of leaving the cooling system, is cooled to a mean transfer temperature $T_u$ to the postcooling water bath of 100° C. to 120° C. Lastly, the molten film is cooled to a final temperature $T_{107}$ of 40° C.

The apparatus for cooling the molten film extruded from the slot die into the cooling system includes means for stretching molten film between the slot die and the cooling system and is characterized by a cooling system comprising a takeoff drum and a water trough, the take-off drum being partially immersed in the water trough, and a postcooling water bath downstream from the cooling system and having the same water level as the water trough.

Figure 1:
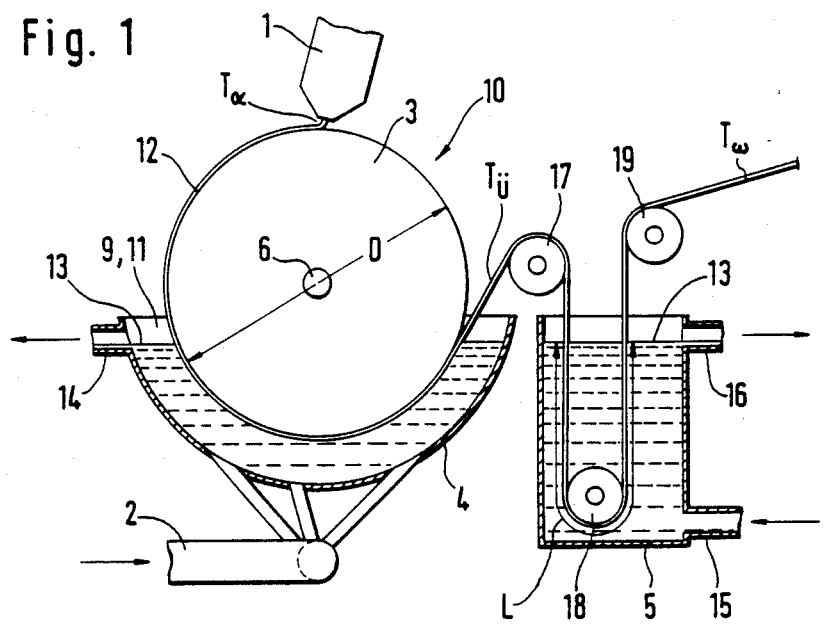
FIG. 1 is a diagrammatic representation of an apparatus according to the invention.

An apparatus according to the invention which is diagrammatically represented in FIG. 1 has a cooling system 10 which comprises a take-off drum 3 and a water trough 4, in which the take-off drum is partially immersed. Downstream of the water trough 4 is a postcooling water bath 5. From a slot die 1, a molten film 12 is extruded onto the circumferential surface, which is generally a metal surface, and, in particular, a steel surface, of the take-off drum 3. The temperature T of the molten film directly after emergence from the slot die 1, is 265° to 275° C. On part of the circumferential surface of the take-off drum 3, from the point of contact of the molten film 12 up to immersion in the water bath of the water trough, heat transfer takes place, sequentially, from one adjacent molten film surface to the circumferential surface of the take-off drum 3 and from the other molten film surface to the ambient air.

Figure 4:
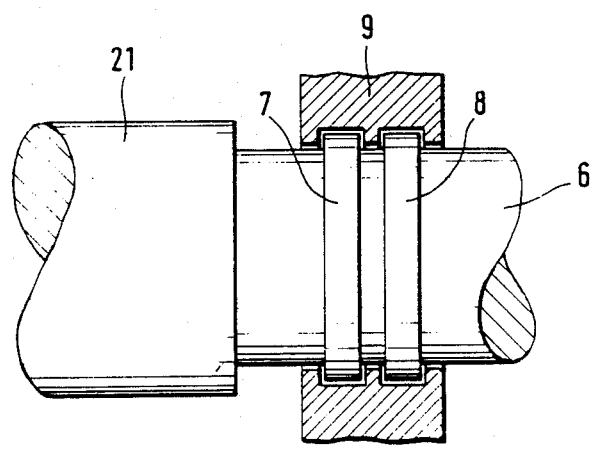
FIG. 4 is a sectional view of the seal of a journal of the take-off drum according to FIG. 3.

The water trough 4 has an inlet 2 for the water, from which the water flowing in is distributed into a number of partial streams within the water trough 4. The excess water flows off through an outlet 14 of the water trough 4. Side walls 9 and 11 laterally bound the water trough 4. Within the water trough 4 a water level 13 is set, which is below the journals 6 of a shaft 21 (see FIG. 4) of the takeoff drum 3, which has a diameter D. Within the water bath of the water trough 4, both molten film surfaces are cooled evenly as in each case there takes place a heat transfer from the film material to water and to the water-cooled partial circumferential surface of the take-off drum 3, which has the same temperature as the water bath. Up to the time of leaving the cooling system 10, the molten film 12 is cooled to a mean transfer temperature $T_u$ to the post-cooling water bath 5 of 100° C. to 120° C. After leaving the water trough 4, the molten film 12 is passed via a deflection roller 17 into the post-cooling water bath 5 where it is passed around a further deflection roller 18 and, after leaving the post-cooling water bath 5, it is passed over a further deflection roller 19 to a winding station (not shown). After leaving the post-cooling water bath 5, the molten film is at its final temperature $T_{107}$ of approximately 40° C. Fresh water flows in via an inlet 15 of the post-cooling water bath 5, while the excess water leaves the post-cooling water bath 5 via an outlet 16. The water level 13 in the post-cooling water bath 5 is kept at the same height as the water level 13 in the water trough 4.

The cooling system 10 comprising take-off drum 3, which is immersed in a water trough 4, and the downstream post-cooling water bath 5, has a number of advantages in comparison with a series arrangement of drums without water cooling, such as, for example, greater flexibility with regard to the necessary dwell time of the molten film 12 for cooling to the desired final temperature, better controllability of the process steps and a lower acquisition price. For example, connecting three drums in series makes the transfer of the molten film from drum to drum problematical as it may lead to pinches in the molten film. Furthermore, the transfer to each drum in each case entails necking, which has a harmful effect on the thickness profile of the molten film or of the intermediate film.

The water bath in the water trough 4 makes it possible to achieve an even cooling of both molten surfaces, as already mentioned above, since the heat transfer takes place with approximately the same transfer coefficient on both surfaces. This produces uniform physical characteristics of the intermediate film over the cross-section of the film.

Figure 2:
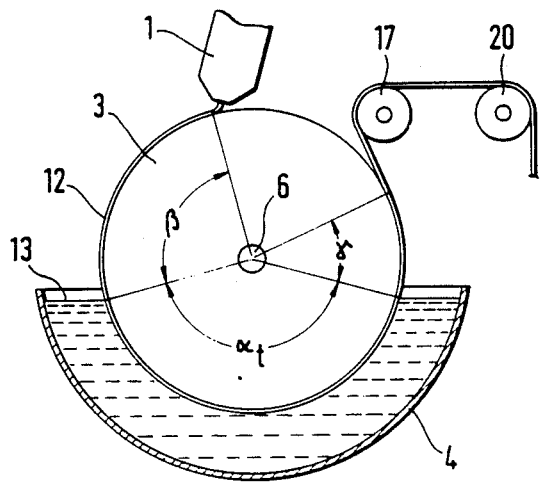
FIG. 2 is a diagrammatic view of a take-off drum with the lowered water bath of the apparatus.

As can be seen in FIG. 2, if the water level 13 is below the journals 6, this is referred to as a lowered water bath, which technically represents the simplest solution and requires no special precautions with regard to the bearing of the shaft and journals in the side walls 9 and 11 of the water trough 4. The angle of inclusion of the water trough 4 in relation to the take-off drum 3 is 150° to 155°. The angle of inclusion $\beta$ between the point of contact of the molten film 12 on the circumferential surface of the take-off drum 3 and the point of immersion of the molten film 12 into the water bath of the water trough 4 is in the range from 87° to 89°, while the angle $\gamma$ between the point of departure of the molten film 12 from the water bath and the point of detachment of the molten film 12 from the circumferential surface of the take-off drum 3 is approximately 41° to 39°. With the lowered water bath, the overall angle of inclusion $\beta + \alpha_t + \gamma$ is greater than with a raised water bath, as will be described subsequently with reference to FIG. 3. That this must be so is evident in view of the fact that a cooling zone comprising a lowered water bath in the water trough 4 is considerably shorter than a cooling zone comprising a raised water bath, provided the dimensions of the take-off drum 3 are otherwise the same, leading to the result that, to compensate for the shortened water cooling zone, the molten film 12 must have, outside the water bath, correspondingly long contact zones with the water-cooled take-off drum 3.

The molten film 12 which is detached from the circumferential surface of the take-off drum 3 is passed via two deflection rollers 17 and 20 downwardly into the post-cooling water bath (not shown), which is designed similar to the embodiment according to FIG. 1.

Figure 3:
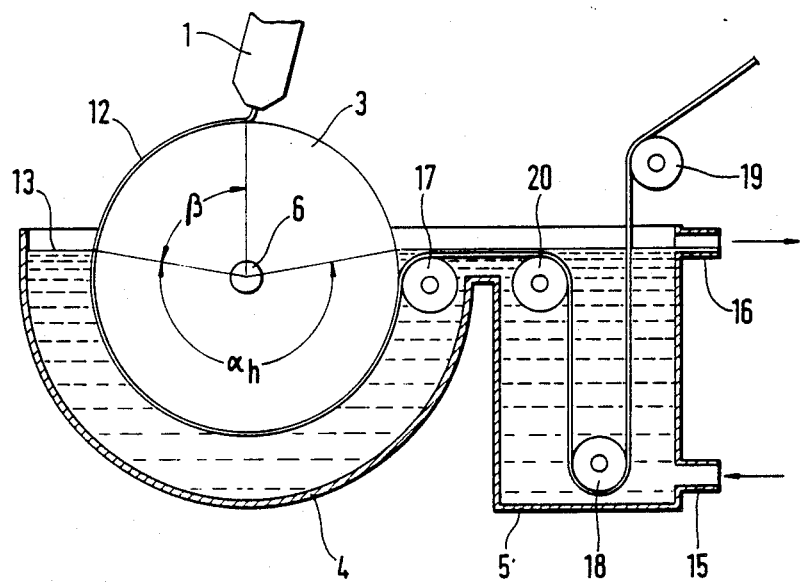
FIG. 3 is a diagrammatic view of a take-off drum with the raised water bath of the apparatus.

FIG. 3 shows an apparatus according to the invention with a raised water bath, in which the water level 13 in the water trough 4 is above the journals 6 of the take-off drum 3. This design is technically more complex, since the two-part design of the water bath for cleaning purposes necessitates that the shaft 21 be sealed off, as is shown in section in FIG. 4. Each of the two journals 6 of the shaft 21 is equipped with two seals 7 and 8 and is mounted by these seals in the corresponding side wall 9 and 11 of the water trough 4. The seals 7 and 8 allow for a predetermined leakage of the water, so that there is no difficulty in keeping the water level 13 at the desired height by corresponding regulation of the water inflow.

With the raised water bath according to FIG. 3, the angle of inclusion $\alpha_h$ of the water trough 4 with respect to the take-off drum 3 is 198° to 203°. The angle $\beta$ is of the order of 77° to 82°. The water trough 4 and the post-cooling water bath 5 constitute mutually communicating vessels, with the one deflection roller 17 being disposed such that the molten film 12, which is partially solidified on the metal surface of the take-off drum 3, is passed through water during the transfer from the water bath of the water trough 4 into the post-cooling water bath 5, and does not come into contact with the air. The detachment of the molten film 12 from the take-off drum 3 takes place in the water bath below the water level 13. The molten film 12 is then deflected downwardly via the deflection rollers 17 and 20 into the post-cooling water bath 5, run close to the bottom of the post-cooling water bath 5 via the further deflection roller 18, passed out vertically upwardly from the post-cooling water bath 5 via the deflection roller 19 and transported to the winding station (not shown). The regulation of the water level 13 in the water trough 4 and the post-cooling water bath 5 takes place, for example, by the water inflow through the inlet 15 and the water outflow via the outlet 16. It is also possible for the water to flow in, for example, via an inflow of the water trough 4 and for the excess water to flow out via the outlet 16 of the post-cooling water bath 5. The inlet 15 is then eliminated in such a case.

For optimum interaction of the cooling system 10 and the post-cooling water bath 5 for effective cooling in which the cooling rate is intended to be high, (i.e., in other words, the cooling time is short), the size of the diameter D of the take-off drum 3 and the length L of the post-cooling water bath 5 are the essential parameters.

Figure 5:
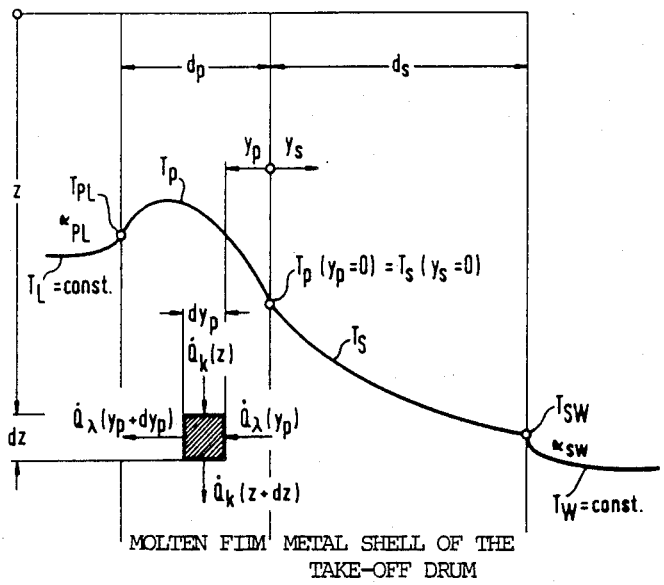
FIG. 5 is a diagram of the temperature variations in the molten film and the surface of the take-off drum, on which the molten film rests.

Before going into the details of these parameters, the temperature variations in the molten film and in the surface of the take-off drum 3 will be briefly explained with reference to the diagrams in FIG. 5. It can be seen from the diagrams that the respective temperature transmissions $T_{PL}$, $T_p = T_s$ and $T_{SW}$ at the boundary surfaces of different materials are substantially constant. In FIG. 5, $d_p$, $d_s$ denote, respectively, the thickness of the molten film 12 and of the metal shell of the take-off drum 3, $dy_p$ and $dz$ denote, respectively, an increment in the molten film, $Q_k$ and $Q\lambda$ denote convective and diffuse heat flow, $T_p$, $T_s$, $T_{sw}$ and $T_w$ denote, respectively, the temperature in the molten film, the temperature in the take-off drum, the temperature at the circumferential surface of the metal shell of the takeoff drum and the temperature of the water in the take-off drum, $T_L$ denotes the air temperature, $y_p$ and $y_s$ denote coordinates in the molten film and in the metal shell of the take-off drum, respectively, z denotes the coordinate in the polymer film, and $\alpha_{PL}$ and $\alpha_{SW}$ denote the heat transfer coefficients (HTC) for molten film/air and take-off drum/water. The water temperature $T_W$ and the air temperature $T_L$ are to be regarded as essentially constant.

With further regard to the undesirable coming off of the molten film or of the partially solidified intermediate film from the drum surface of large drums, effective and rapid cooling is achieved if the diameter of the take-off drum is designed small enough for the intermediate film to be transferred to the water bath even before it comes off. It must be ensured here that the molten film has been solidified to form the intermediate film to such an extent that it can be introduced into the post-cooling water bath without any problems. From a technical viewpoint, there is the additional advantage that, with a small drum, the ratios with regard to good feeding of the molten film and high quality production are improved.

This means that an optimum interaction of the cooling system and of the post-cooling water bath requires a drum diameter of the take-off drum as small as possible, with the molten film already being solidified to such an extent that it can be transferred to the post-cooling water bath without any problems; and that, with a given drum diameter D, the length L of the post-cooling water bath is fixed.

In the production of a film from polymers which mainly consist of polypropylene, the maximum transfer temperature $T_u$ is approximately 120° C. This temperature is to be understood as an arithmetic mean over the film thickness and refers to drum geometries such as are shown in FIGS. 2 and 3. In the remaining thickness range from 200 to 3000 μm, the transfer temperature is virtually independent of the film thickness and may be regarded as constant.

For the optimum arrangement and layout of the cooling system and of the post-cooling water bath, equations can be established in dimensionless form and used to determine drum diameter D and the length of the post-cooling bath L.

The cooling operation of polypropylene melt on a water cooled drum is described by the following heat transfer equations, to be resolved with boundary conditions:

The heat balance for the film, such as is represented in FIG. 5, is as follows:

$$\rho c v \frac{\delta T}{\delta z} = \lambda \frac{\delta^2 T}{\delta y^2} + \frac{\delta \lambda}{\delta T}\left(\frac{\delta T}{\delta y}\right)^2$$

The heat balance for the drum according to FIG. 5 is therefore as follows:

$$\rho_s c_s v \frac{\delta T_s}{\delta z} = \lambda_s \frac{\delta^2 T_s}{\delta y^2}$$

Figure 6A:
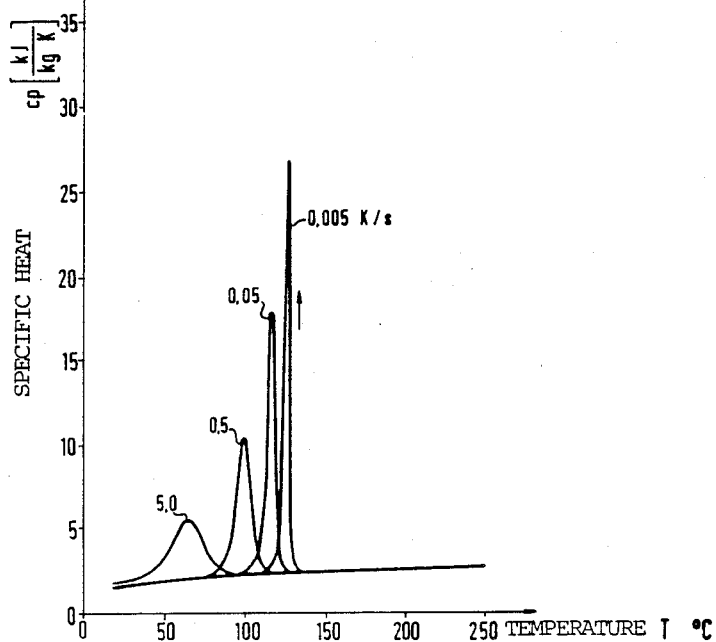
FIGS. 6a–6c are diagrams of the specific heat $c_p$ of polypropylene, the thermal conductivity $\lambda$ and the specific volume v, respectively, as a function of temperature.
Figure 6B:
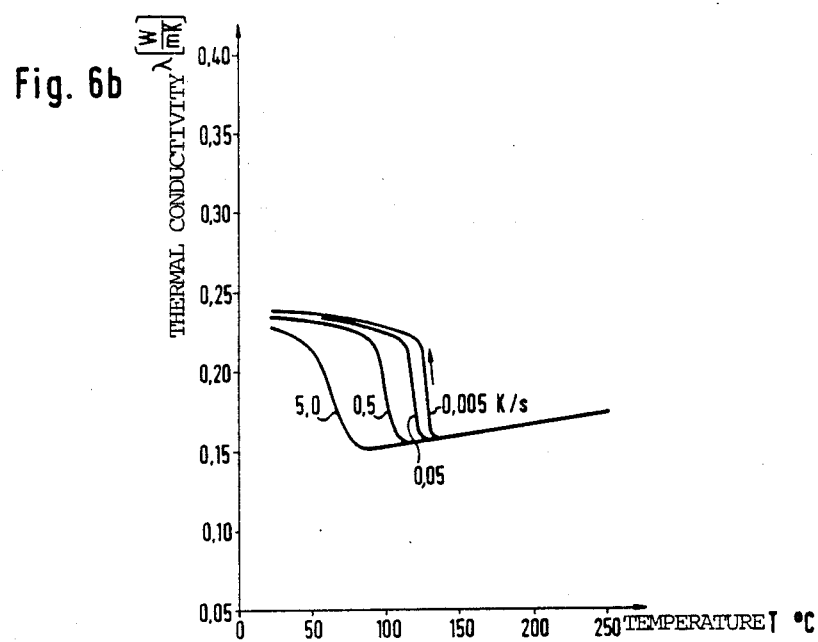
Figure 6C:
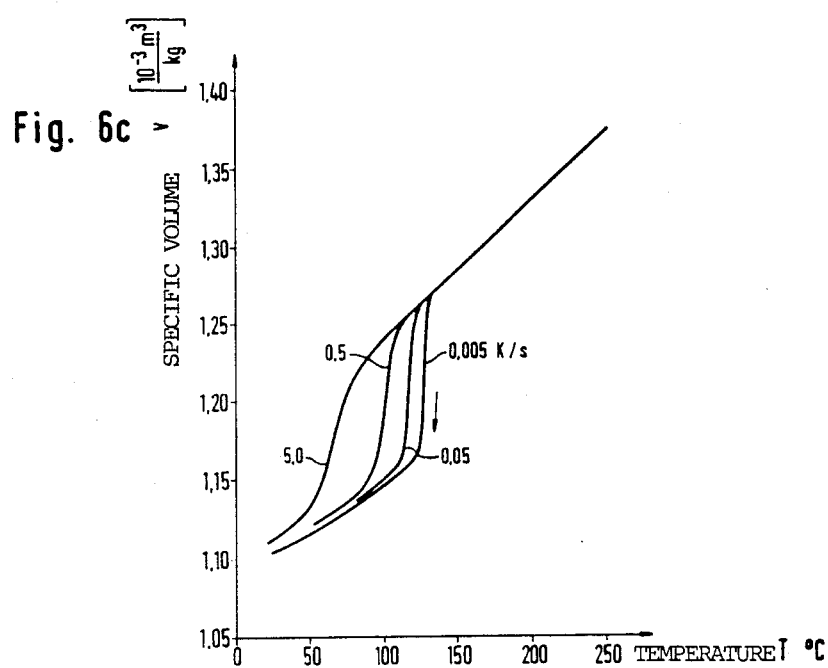

The material values $$\rho = \frac{1}{\text{specific volume } v},$$

and c and λ of polypropylene, as a function of the temperature during rapid cooling of the polypropylene film, are taken from the diagrams of FIGS. 6a, 6b and 6c, which do not require any further explanation.

The influencing variable relationship for the diameter D of the take-off drum and the length L of the post-cooling water bath is as follows:

$$D = f(d, V_A, T_u, T_a - T_u, T_w, \rho \times c, \lambda, \alpha_{st}, \alpha_w)$$

$$L = g(d, V_A, T_w, T_u - T_\omega, T_\omega, \rho \times c, \lambda, \alpha_w)$$

where f and g are functions of the influencing variables. The individual influencing variables here have the following meanings:

| | | |
|---|---|---|
| D | = | drum diameter, in m, |
| d | = | intermediate film thickness, in m, |
| $T_u$ | = | transfer temperature, in °C., |
| $T_a$ | = | temperature of the melt, in °C., |
| $T_w$ | = | drum temperature and water bath temperature, in °C. (the two temperatures are kept the same for the sake of simplicity), |
| ρ | = | density of the intermediate film, in kg/m³, |
| c | = | specific heat of polypropylene, in J/(kg × K), |
| λ | = | thermal conductivity, in W/(m²K), |
| $V_A$ | = | circumferential speed of the take-off drum, |
| $\alpha_{st}$ (HTC) | = | film - drum water, in W/m²K (corresponds to the value $K_{sw}$, $\alpha_{st}$ is approximately 1700 W/(m²K), |
| $\alpha_w$ (HTC) | = | film - water bath, in W/(m²K), |
| $T_\omega$ | = | final temperature of the intermediate film, in °C. |

By applying dimensional analysis, a relationship of dimensionless influencing variables is obtained which is independent of the size of the apparatus.

$$\frac{D}{d} = f''\left(\frac{T_a - T_u}{T_u}, \frac{T_w}{T_u}, \frac{c_A v_A d}{\lambda}, \frac{\alpha_{st} d}{\lambda}, \frac{\alpha_w d}{\lambda}\right)$$

$$\frac{L}{d} = g''\left(\frac{T_u - T_\omega}{T_\omega}, \frac{T_\omega}{T_W}, \frac{c_N v_A d}{\lambda}, \frac{\alpha_{st} d}{\lambda}, \frac{\alpha_w d}{\lambda}\right)$$

For the specific heat quantities $c_A$ of the take-off drum and $c_N$ of the post-cooling water bath, suitable mean values are used, for instance $$c_A = c\left(\frac{T_a + T_u}{2}\right) \text{ and } c_N = c\left(\frac{T_u + T_\omega}{2}\right)$$

The functions f" and g' can be determined by parametric studies in which the individual characteristic values are varied.

For the dimensionless drum diameter D/d, the parametric studies supply the relationship, $$\frac{D}{d} = K_{t,h}\left(\frac{\rho c_A v_A d}{\lambda}\right) \cdot \left(\frac{\alpha_{st} d}{\lambda}\right)^{-0.15} \cdot \left(\frac{\alpha_w d}{\lambda}\right)^{-0.15} \quad \text{(a)}$$

$$\cdot \left(\frac{T_a - T_u}{T_u}\right)^{0.4} \cdot \left(\frac{T_w}{T_u}\right)^{0.46},$$

where the constant $K_t = 0.380$ applies for the lowered water bath and the constant $K_h = 0.330$–$0.340$, in particular, $K_h = 0.337$, applies for a raised water bath. The geometries of he water baths relative to the drums, in particular, the angles of inclusion with respect to the take-off drums, for which the constants $K_t$ and $K_h$ were calculated are shown by FIGS. 3a and 3b.

The result for the length L of the post-cooling water bath is as follows:

$$\frac{L}{d} = K_w\left(\frac{\rho c_N c_A d}{\lambda}\right) \cdot \left(\frac{\alpha_w d}{\lambda}\right)^{0.25} \quad \text{(b)}$$

$$\cdot \left(\frac{T_u - T_\omega}{T_\omega}\right)^{0.72} \cdot \left(\frac{T_w}{T_\omega}\right)^{0.46},$$

with $K_w = 0.4$ to 0.8, and, in particular, 0.5 to 0.7.

The variables included in the equations (a) and (b) are specified in detail above in connection with the influencing variable relationship.

The variables D, L to be determined with the two equations (a) and (b) can be calculated using an example.

The following parameters are given:

| | | |
|---|---|---|
| d | = 1.3 mm | (molten film thickness) |
| $V_A$ | = 33 m/min | (circumferential speed of the take-off drum) |
| $T_a$ | = 270° C. | (melt temperature) |
| $T_u$ | = 120° C. | (transfer temperature) |
| $T_W$ | = 40° C. | (water temperature of the take-off drum) |
| $T_\omega$ | = 40° C. | (final temperature of the take-off drum) |
| $\alpha_W$ | = 2015 W/m²K | (HTC film - water) |
| $\alpha_{st}$ | = 1700 W/m²K | (HTC film - steel shell) |
| $\lambda$ | = 0.2 W/mK | (thermal conductivity of polypropylene) |
| $\rho \times C_A$ | = 2.0 × 10⁶ J/m³K | (density × specific heat of polypropylene on the take-off drum) |
| $\rho \times C_N$ | = 1.7 × 10⁶ J/m³K | (density × specific heat of polypropylene in the post-cooling water bath). |

Calculation with these data for a lowered water bath gives a drum diameter D=1.1 m and a length of the post-cooling water bath L=4.8 m.

It should be noted that the equations specified relate to geometrically similar drums having the initial geometries as are reproduced in FIGS. 3a and 3b. As comparisons with model calculations have shown, a transfer to dissimilar geometries (changed angle of inclusion) is achievable by inclusion of the dwell times of the molten film or of the intermediate film in the cooling system and in the post-cooling water bath.

COMPARATIVE EXAMPLE

The variables from the above example are given. The drum diameter of the take-off drum with which—without post-cooling water bath—the melt can be cooled to 40° C. is ought. Calculation with $\rho \times c \approx 1.8 \times 10^6$ J/m³K yields a value of D=3.0 m, which is of no use for practical purposes.

What is claimed is:

1. A process for cooling a molten film which is extruded from a slot die, comprising the steps of:
   providing a cooling drum having a circumferential surface, the cooling drum being partially immersed in a first water bath;
   providing a second water bath;
   contacting one surface of the molten film, immediately after extrusion of the film from the slot die, to the circumferential surface of the cooling drum so that heat transfer occurs between the one surface of the molten film and the cooling drum and between the other surface of the molten film and the air;
   rotating the cooling drum to move the molten film through the first water bath, whereby the water in said first water bath directly contacts the film to cool and partially solidify the molten film such that it will not prematurely separate from the cooling drum and is removable from the cooling drum without elongation; and
   removing the partially solidified molten film from the cooling drum while it is immersed in the first water bath and moving the removed, partially solidified molten film through water to the second water bath to bring the molten film to a desired final temperature.

2. A process as claimed in claim 1, wherein the step of rotating the drum to move the molten film through the first water bath comprises cooling the molten film to a mean transfer temperature of about 100° C. to 120° C.

3. A process as claimed in claim 1, wherein the step of moving the partially solidified molten film through the second water bath further comprises cooling the molten film to a final temperature of about 40° C.

4. An apparatus for cooling a molten film which is extruded from a slot die comprising:
   a first water bath having a first water level;
   a cooling take off drum having a circumferential surface for receiving the molten film on its circumferential surface directly after the film is extruded, the cooling drum being partially immersed in the first water bath for rotation about its longitudinal axis;
   shaft means for rotating the cooling drum around its longitudinal axis, whereby the cooling drum moves the received molten film through the first water bath so that the molten film is cooled and partially solidified such that it will not prematurely separate from the cooling drum and can be removed without elongation;
   means for removing the partially solidified molten film from the circumferential surface of the cooling drum while it is immersed in the first water bath, and moving the removed partially solidified molten film through water to a second bath having a second water level; and means for moving the partially solidified molten film through the second water bath, whereby the molten film is cooled to a desired final temperature.

5. An apparatus as claimed in claim 4, wherein the water level in the first water bath is substantially equal to the water level in the second water bath.

6. An apparatus as claimed in claim 4, wherein the water level of the first bath is higher than the longitudinal axis of the cooling drum.

7. An apparatus as claimed in claim 6, wherein the cooling drum comprises a shaft and a pair of seals on the shaft for mounting the shaft in a respective side wall of the first water bath.

8. An apparatus as claimed in claim 4, wherein the first water bath and the second water bath are in communication with one another.

9. An apparatus as claimed in claim 4, wherein drum diameter D of the cooling drum is less than or equal to $$0.33 \cdot d \left( \frac{\rho c_A v_a d}{\lambda} \right) \left( \frac{\alpha_{ST} d}{\lambda} \right)^{-0.15} \left( \frac{\alpha_w d}{\lambda} \right)^{-0.15} \left( \frac{T_a - T_u}{T_u} \right)^{0.4} \left( \frac{T_w}{T_u} \right)^{0.46}$$

where d is the thickness of the molten film, $\rho$ is the density, in kg/m$^3$, of the molten film, $c_A$ is the specific heat of the film material on the cooling drum, $v_A$ is the circumferential speed of the cooling drum, $\lambda$ is the thermal conductivity, $\alpha_w$ is the heat transfer coefficient between the molten film and water, $\alpha_{ST}$ is the heat transfer coefficient between the molten film and the surface of the cooling drum, $T_a$ is the melt temperature, $T_u$ is the transfer temperature and $T_w$ is the water temperature of the first water bath.

10. An apparatus as claimed in claim 9, wherein the water level of the first water bath is below the longitudinal axis of the cooling drum and the first water bath with respect to the cooling drum forms an angle of inclusion $\alpha_T$ is from about 150 to 155 degrees.

11. An apparatus as claimed in claim 9, wherein the water level of the first water bath is above has an longitudinal axis of the shaft of the cooling drum and the angle of inclusion $\alpha_h$ of the first water bath with respect to the cooling drum of from about 198 to 203 degrees.

12. The apparatus as claimed in claim 9, wherein the length L of the molten film in the second water bath is at least equal to $$d \cdot 0.5 \left( \frac{\rho \cdot c_N \cdot v_{Ia} \cdot d}{\lambda} \right).$$

$$\left( \frac{\alpha_w d}{\lambda} \right)^{0.25} \left( \frac{T_u - T_\omega}{T_\omega} \right)^{0.72} \left( \frac{T_w}{T_\mu} \right)^{0.46}$$

where $c_N$ is the specific heat of the film material in the second water bath and $T_\omega$ is the final temperature of the take-off drum.

* * * * *

UNITED STATES PATENT AND TRADEMARK OFFICE
CERTIFICATE OF CORRECTION

PATENT NO. : 4,911,874
DATED : March 27, 1990
INVENTOR(S) : PEIFFER et al.

It is certified that error appears in the above—identified patent and that said Letters Patent is hereby corrected as shown below:

Column 12, line 8, delete "is".

Column 12, line 10, delete "has an" and insert therefor --the--.

Column 12, line 11, delete "the" (third occurrence) and insert --has an--.

Column 12, line 30, in the last bracket of the mathematical equation, delete "$T_\mu$" from the denominator and insert --$T_\mu$--.

Signed and Sealed this

Eighth Day of December, 1992

Attest:

DOUGLAS B. COMER

Attesting Officer

Acting Commissioner of Patents and Trademarks